Patented July 15, 1924.

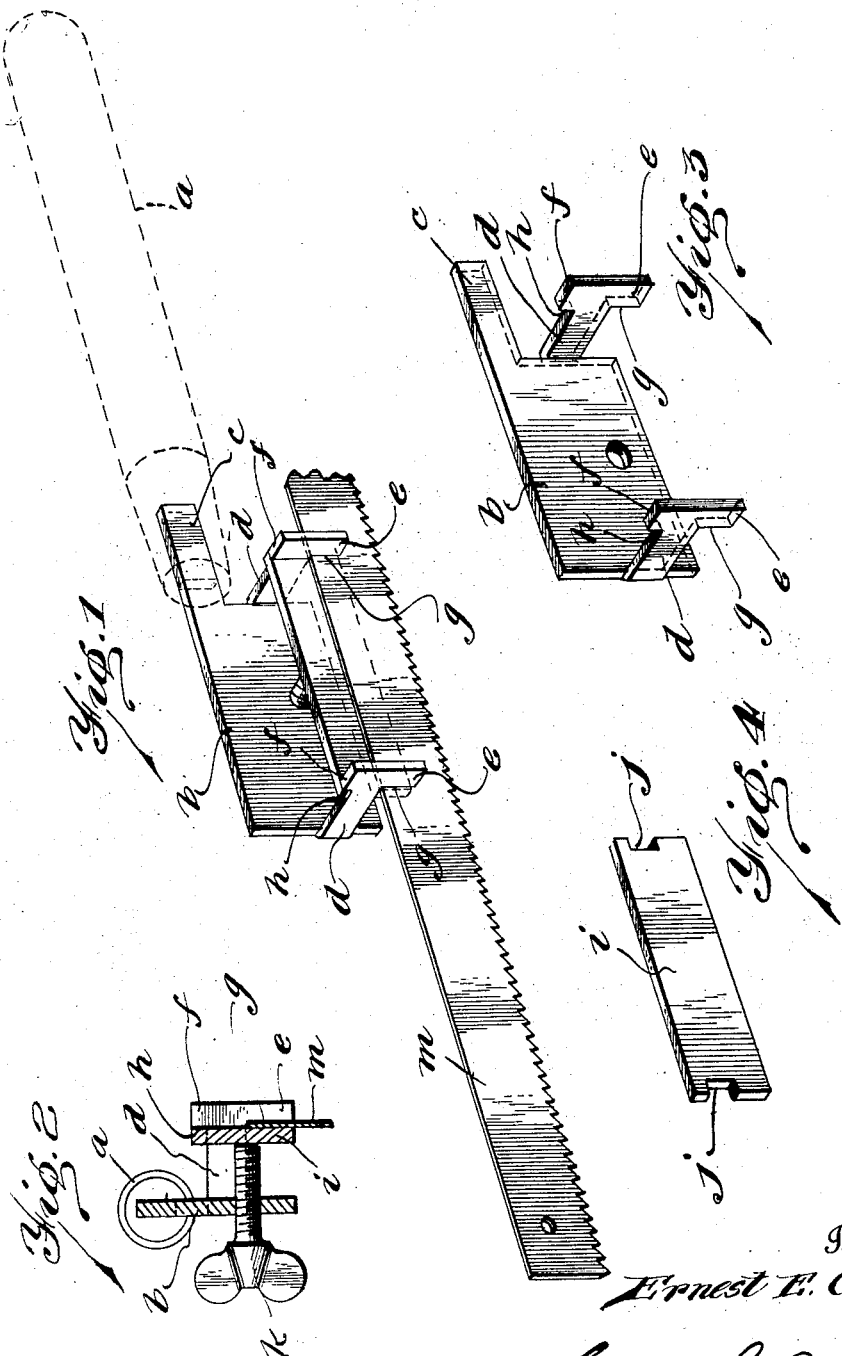

1,501,752

UNITED STATES PATENT OFFICE.

ERNEST E. CULLEN, OF NEW BALTIMORE, MICHIGAN, ASSIGNOR OF ONE-HALF TO ROBERT H. REITER, OF NEW BALTIMORE, MICHIGAN.

SAW-BLADE HOLDER.

Application filed May 9, 1923. Serial No. 637,677.

*To all whom it may concern:*

Be it known that I, ERNEST E. CULLEN, a citizen of the United States, residing at New Baltimore, in the county of Macomb and State of Michigan, have invented certain new and useful Improvements in Saw-Blade Holders, of which the following is a specification.

This invention relates to saw blade holders and more particularly to one that is adapted to hold a broken hack saw blade.

With the present form of hack saw blade holders it is impossible to use a broken hack saw blade since the broken blade is not adapted to fit on the pins carried by the yoke arms of the holder. It is well known that a hack saw blade is very easily broken under any undue strain and as a result quite a few blades are wasted, but with my device a broken hack saw blade may be clamped in my holder and the blade may then again be used, thus eliminating a waste resulting from the use of only an ordinary hack saw blade holder.

The object of my invention is to provide means for quickly and securely clamping a hack saw blade to a support, and furthermore, the clamping means is adapted to engage the faces of the hack saw blade at two widely separated points and at any place along the hack saw blade. With this gripping means it is possible to grip the blade so as to prevent longitudinal movement of the blade with respect to the support when the saw is in use.

In the drawings:

Fig. 1 is a perspective view of my holder with a broken hack saw blade clamped therein.

Fig. 2 is a transverse section through my holder showing the clamping means.

Fig. 3 is a detail in perspective of the support.

Fig. 4 is a detail in perspective of the clamping plate.

The handle $a$ has secured thereon a support $b$ by means of the tongue $c$ which is forced within one end of the handle as shown in Fig. 1. The support $b$ is provided with a pair of laterally extending ears $d$, said ears projecting substantially 90 degrees from the plane of the support. These ears are each provided at the outer ends with a downwardly extending lip $e$ and the shorter upwardly extending lip $f$ forming shoulders $g$ and $h$ respectively.

The clamping plate $i$ is provided at each end with notches $j$, the said notches adapted to engage the narrow portion of the ears $d$ and to be slidably supported thereon. A clamping screw $k$ is threaded through the support and the stud end of the screw is adapted to bear against the clamping plate to force the said clamping plate against the shoulders $g$ and $h$ carried by the laterally extended ears. A saw blade $m$ is adapted to fit between the clamping plate $i$ and the downwardly extending lip $e$ and when the clamping screw forces the clamping plate against the shoulders $g$ the saw blade will be firmly clamped between the shoulders $g$ and the clamping plate.

Sufficient pressure may be applied to the clamping means whereby the saw blade is securely held in place and prevented from longitudinal movement with respect to the support. It is a very easy matter to disengage the saw blade from the holder when it is necessary to remove the same and another blade may then be quickly inserted and clamped into place.

With the use of my holder it is possible to clamp therein a broken hack saw blade of different lengths. The shoulders $g$ provide a pair of widely spaced points for engaging the outer face of the saw blade, while the clamping plate $i$ engages the inner face of the saw blade between the two widely spaced shoulders $g$. The clamping screw which bears against the clamping plate to clamp the saw blade in the holder causes the hack saw blade to be simultaneously clamped at two widely spaced points.

Another important feature of this invention is that it enables the hack saw blade to be used so that it can reach otherwise inaccessible places or bear against flat surfaces which cannot be done with the ordinary hack saw frame.

What I claim is:

1. A saw blade holder, having in combination a support provided with a laterally projecting arm, a clamping vise supported by said arm, and means for clamping the jaws of the vise to hold the saw blade in a plane offset from the plane of the support.

2. A saw blade holder, having in combination a support provided with a pair of laterally extending arms, a pair of clamping vises supported by the arms in a plane offset from the plane of the support, and means carried by the support for clamping the jaws of the vises to clamp a saw blade therebetween and position the same in a plane offset from the plane of the support.

3. A saw blade holder, having in combination a support provided with a laterally extending arm, a clamping vise supported by the arm in a plane offset from the plane of the support, and a screw passing through the support for closing the jaws of the clamping vise to clamp a saw blade therebetween and position the same in a plane offset from the plane of the support.

4. A saw blade holder having in combination, a support provided with a pair of ears having upturned and downturned lips on the end thereof, said downturned lips adapted to engage one face of a saw blade, a clamping member slidably supported between said ears and arranged to engage the other face of the saw blade and the upturned lip, and means for forcing the said clamping member against the upturned lips carried by the support and the saw blade to clamp the saw blade between the downturned lips and the clamping member.

5. A saw blade holder, having in combination, a support provided with a pair of ears having downturned portions for engaging the outer face of a saw blade, a clamping member slidably supported by said ears and arranged to engage the inner face of the saw blade, and means for forcing the said clamping member against the downturned ear portions carried by the support to clamp the saw blade therebetween.

6. A saw blade holder, having in combination a support provided with widely spaced ears having downturned portions for engaging the outer face of a saw blade at spaced intervals, a clamping plate slidably supported on said support and arranged to engage the inner face of the saw blade intermediate of the down-turned ear portions, and a clamping screw carried by said support and adapted to bear against the clamping plate for clamping the saw blade between the downturned ear portions and the said clamping plate.

7. A saw blade holder, having in combination a support provided with a pair of ears having downwardly projecting portions at the ends for engaging the outer face of a hack saw blade, a clamping plate provided with notches arranged to fit over the said ears, said plate slidably supported thereon, and adapted to engage the inner face of the hack saw blade, and a clamping screw carried by the support and adapted to bear against the clamping plate for clamping the hack saw blade between the down-turned portions of the ears and the said clamping plate.

8. A saw blade holder, having in combination, a support having laterally extending ears positioned at substantially right angles to the plane of the support and provided with down-turned ends arranged to engage the outer face of a hack-saw blade, a clamping plate slidably supported by said ears and positioned between said laterally extending ears, said plate adapted to engage the inner face of the hack saw blade and a clamping screw carried by the support and arranged to bear against the clamping plate for binding the saw blade between the downturned ends of the said laterally extending ears and the said clamping plate.

In testimony whereof I affix my signature.

ERNEST E. CULLEN.